United States Patent [19]
Hong et al.

[11] Patent Number: 5,617,488
[45] Date of Patent: Apr. 1, 1997

[54] RELAXATION WORD RECOGNIZER

[75] Inventors: Tao Hong, Buffalo; Jonathan J. Hull, Amherst, both of N.Y.

[73] Assignee: The Research Foundation of State University of New York, Buffalo, N.Y.

[21] Appl. No.: 381,767

[22] Filed: Feb. 1, 1995

[51] Int. Cl.$^6$ .............................. G06F 15/02; G06K 9/62; G06K 9/72
[52] U.S. Cl. ........................... 382/229; 382/209; 382/230; 395/751
[58] Field of Search ..................................... 382/229, 230, 382/209; 364/419, 900

[56] References Cited

U.S. PATENT DOCUMENTS

| | | | |
|---|---|---|---|
| 3,969,698 | 7/1976 | Bollinger et al. | 340/146.3 WD |
| 4,868,750 | 9/1989 | Kucera et al. | 364/419 |
| 5,062,143 | 10/1991 | Schmitt | 382/230 |
| 5,377,280 | 12/1994 | Nakayama | 382/229 |
| 5,377,281 | 12/1994 | Ballard et al. | 382/229 |
| 5,392,363 | 2/1995 | Fujisaki et al. | 382/224 |

OTHER PUBLICATIONS

T. G. Rose & L. J. Evett, "Text Recognition Using Collocations And Domain Codes", Proceedings Of The Workshop On Very Large Corpora Academic and Industrial Perspectives, pp. 65–73, Jun. 22, 1993, Ohio.
T.K. Ho, J. J. Hull, & S. N. Srihari, "A Word Shape Analysis Approach To Lexicon Based Word Recognition", *Pattern Recognition Letters*, pp. 821–826, Nov. 1992, North–Holland.
K. W. Church & P. Hanks, "Word Association Norms, Mutual Information, and Lexicograph", pp. 76–83.
T. Hong & J. J. Hull, "Text Recognition Enhancement With A Probabilistic Lattice Chart Parser", In Proceedings Of The Second International Conference On Document Analysis (ICDAR93), pp. 222–225, Oct. 1993, Japan.
J. J. Hull, "A Hidden Markov Model For Language Syntax In Text Recognition", Appeared: 11th Int. Conf. On Pattern Recognition, The Hague, pp. 124–127, Aug. 30–Sep. 3, 1992.
J.J. Hull, S. Khoubyari, & T. K. Ho, "Word Image Matching As A Technique For Degraded Text Recognition", Appeared: 11th Int. Conf. On Pattern Recognition, The Hague, pp. 665–668, Aug. 30–Sep. 3, 1992.
T. G. Rose, L. J. Evett, & R. J. Whitrow, "The Use Of Semantic Information As An Aid To Handwritting Recognition", pp. 629–637.
A. Rosenfeld, R. A. Hummel, & S. W. Zucker, "Scene Labeling By Relaxation Operation", *IEEE Transactions On Systems, Man, And Cybernectics*, vol. SMC–6, pp. 420–433, Jun. 1976.

*Primary Examiner*—Leo Boudreau
*Assistant Examiner*—Monica S. Davis
*Attorney, Agent, or Firm*—Nixon, Hargrave, Devans & Doyle

[57] ABSTRACT

A word recognizer system 10 has a probabilistic relaxation process that improves the performance of an image text recognition technique by propagating the influence of word collocation statistics. Word collocation refers to the likelihood that two words co-occur within a fixed distance of one another. The word recognizer 10 receives groups of visually similar decisions (called neighborhoods) for words in a running text. The position of decisions within the neighborhoods are modified based on how often they co-occur with decisions in the neighborhoods of other nearby words. This process is iterated a number of times effectively propagating the influence of the collocation statistics across an input text.

8 Claims, 4 Drawing Sheets

RELAXATION WORD RECOGNIZER

BACKGROUND

This invention relates in general to a word recognition apparatus and method, and in particular, to a word recognition method an apparatus for recognizing one word in the context of adjacent words.

The recognition of images of words of text is a difficult problem, especially when the image texts are degraded by noise such as that introduced by photocopying or facsimile transmission. Recently, methods for improving the quality of image text recognition results have focused on the use of knowledge about the language in which the document is written. J. J. Hull, S. Khoubyari and T. K. Ho, "Word Image Matching as a Technique for Degraded Text Recognition," in *Proceedings of 11th IAPR International Conference on Pattern Recognition*, The Hague, The Netherlands, pp. 665–668, 1992; J. J. Hull, "A Hidden Markov Model for Language Syntax in Text Recognition," in *Proceedings of 11th IAPR International Conference on Pattern Recognition*, The Hague, The Netherlands, pp. 124–127, 1992. These techniques often post-process the results of a word recognition process that provides various alternatives for the identity of each word that are called its neighborhood. The objective of the language model is to choose the alternatives for words that make sense in the context of the rest of the text.

Word collocation data is one source of information that has been investigated in computational linguistics and that has been proposed as a useful tool to post-process word recognition results. H. S. Baird, Private communication about the use of word collocation to improve OCR results, February, 1989; K. W. Church and P. Hanks, "Word Association Norms, Mutual Information, and Lexicography," *Computational Linguistics*, Vol. 16, No. 1, pp. 22–29, 1990; T. G. Rose, R. J. Whitrow and L. J. Evett, "The Use of Semitic Information as an Aid to Handwriting Recognition," in *Proceedings of 1st International Conference of Document Analysis and Recognition*, pp. 629–637, Saint-Malo, France, 1991. Word collocation refers to the likelihood that two words co-occur within a fixed distance of one another. For example, it is highly likely that if the word "boat" occurs, the word "river" will also occur somewhere in ten words on either side of "boat." Thus, if "river" had been misrecognized with the neighborhood "rover, river, ripper" (i.e., rover is the top choice, river the second choice, etc.), the presence of "boat" nearby would allow for the recognition error to be corrected.

Previous work using word collocation data to post-process word recognition results has shown the usefulness of this data. T. G. Rose and L. J. Evett, "Text Recognition Using Collocations and Domain Codes," in *Proceedings of the Workshop on Very Large Corpora: Academic and Industrial Perspectives*, pp. 65–73, Columbus, Ohio, 1993. This technique used local collocation data about words that co-occur next to each other to improve recognition performance. A disadvantage of this approach was that it did not allow for successful results off:one word to influence the results on another word. In other fields such as in edge detection of an image, it has been proposed to use relaxation techniques. See, e.g., A. Rosenfeld, R. A. Hummel and S. W. Zucker, "Scene Labeling by Relaxation Operations," in *IEEE Trans. on Sys. Man and Cyb*, SMC-6(6):420–433, 1976.

SUMMARY

The invention provides a method and an apparatus for performing a relaxation-based process on a computer to propagate the results of word collocation post-processing within sentences. The promotion of correct choices at various locations within a sentence influences the promotion of word decisions elsewhere. This effectively improves on a strictly local analysis by allowing for strong collocations to reinforce weak (but related) collocations. Hereinafter is shown an experimental analysis in which the process is applied to improving text recognition results that are less than 60% correct. The correct rate is effectively improved to 82% or better in all cases.

The invention is a word recognition method and apparatus that uses a relaxation-based process so that the results of word collocations reinforce each other in subsequent iterations of the relaxation method. The method is performed with the use of a special or general purpose computer having random access memory for holding input data and computed data. The computer also has access to databases that may be stored on mass storage devices such as disk drives or CD roms or in random access memory. The mass storage memory includes a dictionary of words and collocation data regarding the likelihood of one word being adjacent to another. A read only memory includes the operating system and dedicated application programs for the computer. The computer receives as its input a plurality of pixel data signals.

The pixel data signals are generated by a scanner. The scanner uses a light source to scan the document. The scanner divides the document into two dimensional bit map area of pixel areas. Each pixel area is associated with a corresponding detected intensity of light. These pixel light intensity signals may be analog signals that are subsequently converted into digital signals, each digital signal being represented of the light intensity for a given pixel area. The scanner outputs the pixel data signals to the computer.

The computer segments the input pixel data signals into words, each word corresponding to a number of spatially related pixel data and compares the pixel data signals to data stored in its databases. The computer identifies candidates for word recognition based upon the likelihood that one or more word candidates stored in the databases is the correct word. The word candidates are ranked in neighborhoods based upon the likelihood of correctness of each candidate. Each neighborhood has one or more adjacent neighborhoods. Each neighborhood is ranked by its first to last choice of candidates. The computer accesses from its word collocation data base collocation data for each word candidate. Collocation data may be the likelihood of the word candidate appearing with its adjacent word candidate. In this manner, each word candidate is sorted by its collocation score. The changes in ranking of word candidates are compared. When the number of changes in a neighborhood is less than a predetermined threshold value, the computer displays the likelimost word candidates for the text. As an alternative, the computer may order the likelimost word candidates to be printed on a printer.

The method and apparatus are performed in accordance with a relaxation process. In operating the relaxation process, the collocation score for each word candidate is computed by adding the probability of correctness of the word candidate to the products of the collocation data of each candidate and its top choice neighbors and probability of correctness for each top choice neighbor. That sum is then divided by a corresponding sum of probability of correctness for all the neighbors and the collocation products of each neighbor with the probability of correctness with the first choice of adjacent neighborhoods. Accordingly, the method and the apparatus uses neighborhoods that comprise the top ranked choices for adjacent word candidates.

Having summarized the invention, those skilled in the art are referred to the following detailed description of drawings.

DETAILED DESCRIPTION

System Description

Figure 1:
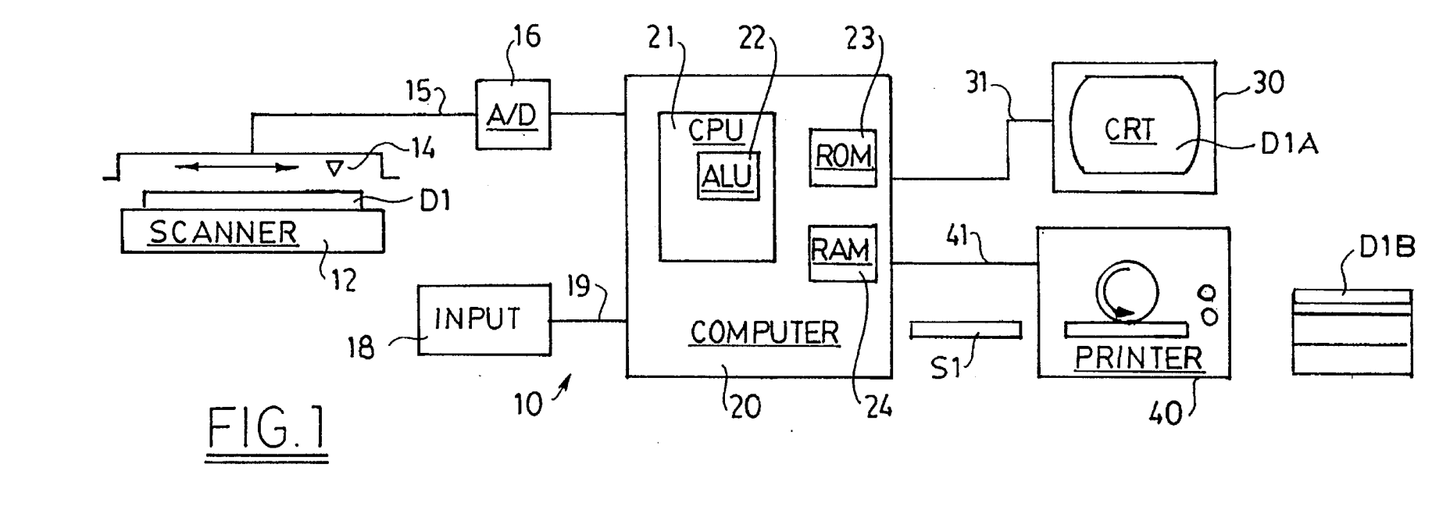
FIG. 1 is a schematic representation of-a word recognition apparatus.

With reference to FIG. 1, there is shown a word recognition apparatus 10. A scanner 12 is coupled via a signal line 15 to a computer 20. Computer 20 has output lines 31, 41 coupled respectively to output display 30 and printer 40. In the scanner 12 a light source 14 travels the length and width of the document D 1. The light source 14 illuminates the document and a suitable detector such as a charge coupled device, not shown, records the reflection of the light source from the document. In this manner, the scanner 12 outputs signals representative of the varying intensity of the text image on document D1 from left to right and top to bottom as the light source 14 travels over the document D1. Of course, the scanning operation is not limited to the above. In an alternate embodiment, a single charge coupled device array could instantly image all of the document onto a suitable array. Then the output of the array would be put onto signal line 15.

Either the scanner 12 or the computer 20 is suitably equipped with an A-to-D converter 16. The A-to-D converter 16 converts the time varying analog signal from the scanner 12 into digital signals. A typical digital signal may vary over 256 shades of gray ranging from absolute white to pure black. As such, the value associated with any particular pixel area will correspond to the amount of background and text image in the given pixel area. So, each digital pixel signal corresponds to a real world light intensity signal for light from a given pixel area of the document D1.

The computer 20 has a central processing unit 21 which includes an arithmetic logic 22 for performing suitable calculations on data. A read only memory 23 stores operations and selected application programs for operating the computer 22. Random access memory 24 stores input data as well as data arrived from operations performed upon the input data in accordance with the operating program of the computer 20. Other inputs to the computer 20 may be made via input device 18 over signal line 19. The input device 18 may be a keyboard or a mouse or both. The computer receives the input pixel data signals and operates on the pixel data signals to recognize the pixels as words. The computer uses a character recognition program to identify individual alphanumeric characters that correspond to the received pixel data signals. Next the characters are segmented into separate word positions. For each word position, the word recognition program provides a neighborhood of word candidates. Each word candidate has an initial probability of correctness. The word candidates are selected from a dictionary stored in a data base. Each word position has at least two word candidates and as many as ten or more.

The word candidates may be displayed on display 30 in the order of likeliness of correctness. The computer is also connected to a printer 40. Accordingly, the recognized words may be output as data signals via line 41 to the printer 40 where the words will be printed on a document D1$b$.

The computer 20 may also manipulate the recognized words in accordance with any standard word processing computer application. As such, in one application of the invention, a document is scanned into computer 20 where the pixel data signals of the document are recognized as words. Then the words are available to an operator using keyboard 18 in accordance with the word processing program. The operator may make changes to the text by adding and deleting text or reformatting the words accordance with well known word processing techniques. Thereafter, the final document may be displayed on a CRT 30 and/or printed on a printer 40.

Figure 2:
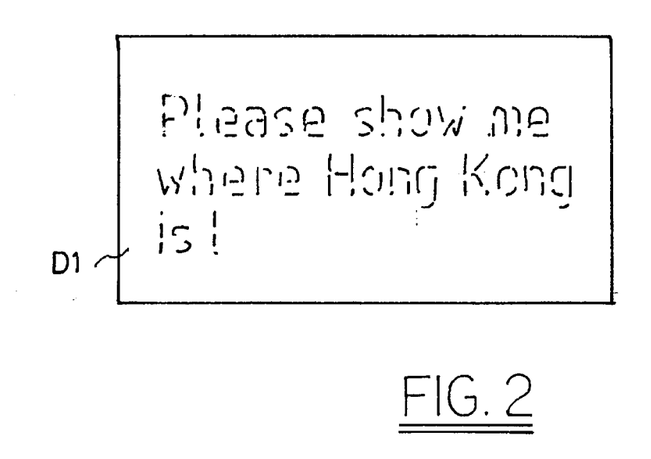
FIG. 2 is a drawing of the obscured text on a document.

Next there will be described typical operation of the word recognition system 10 on a short passage of text. For example, the word recognition system 10 may operate on a document D1 as shown in FIG. 2. The document D 1 contains a poor facsimile of the phrase "Please show me where Hong Kong is!"

Process

Word collocation measures the likelihood that two words co-occur within a given distance of each other. A numerical measure of the collocation strength of word pair (x,y) is given by the mutual information of (x,y):

$$MI(x,y) = \log_2 \frac{P(x,y)}{P(x)P(y)} \qquad 1.0$$

where P(x) and P(y) are the probabilities of observing words x and y in a corpus of text and P(x,y) is the joint probability of observing x and y within a fixed distance of one another. The strength of word collocation can also be measured by the frequency of a word pair F(x,y) in a corpus of fixed size.

The relaxation process that incorporates word collocation data receives the neighborhoods for each word in a sentence as input. Each neighborhood (e.g. snow, slow, show) is a group of visually similar words. The neighborhoods are initially ranked by the confidence values provided by a word recognition program in a manner well known in the art. Each word in a neighborhood $\omega_{ij}$ is repeatedly re-ranked for k iterations by calculating its new word collocation score:

$$P^{(k+1)}_{(\omega_{ij})} = \frac{P^{(k)}_{(\omega_{ij})} + \gamma_{(\omega_{ij},\omega_{i+1,1})} P^{(k)}_{(\omega_{i+1,1})} + \gamma_{(\omega_{i-1,1},\omega_{ij})} P^{(k)}_{(\omega_{i-1,1})}}{\sum_{l=1}^{n} [P^{(k)}_{(\omega_{il})} + \gamma_{(\omega_{ij},\omega_{i+1,1})} P^{(k)}_{(\omega_{i+1,1})} + \gamma_{(\omega_{i-1,1},\omega_{ij})} P^{(k)}_{(\omega_{i-1,1})}]} \qquad 2.0$$

where $P^{(k+1)}_{(\omega_{ij})}$ is the probabilistic score of the word candidate $\omega_{ij}$ at time k+1 and n are the number of neighbors in a neighborhood. The initial score $P_{(\omega ij)}^{(0)}$ is the confidence (between 0 and 1) provided by a word recognizer for the word candidate $\omega_{ij}$. The compatibility functions $r_{(\omega i-1,1,\omega ij)}$ and $r_{(\omega ij,\omega i+1,1)}$ are defined as $$\gamma_{(\omega_{i-1,1},\omega_{ij})} = \frac{MI_{(\omega_{i-1,1},\omega_{ij})}}{\sum_{k=1}^{n} |MI_{(\omega_{i-1,1},\omega_{ik})}|} \qquad 3.1$$

and $$\gamma_{(\omega_{ij},\omega_{i+1,1})} = \frac{MI_{(\omega_{ij},\omega_{i+1,1})}}{\sum_{k=1}^{n} |MI_{(\omega_{ij},\omega_{i+1,1})}|} \qquad 3.2$$

where MI(x,y) is the Mutual Information of the word pair (x,y). This method of calculating the score for $\omega_{ij}$ at time k+1 is an improvement over a previous approach that did not incorporate recognition confidence.

This measure uses the top-ranked choice of adjacent words to adjust the ranking in each neighborhood. As such, the relaxation process operates on the collocation data to selectively improve the rankings in a neighborhood. The denominator of the above expression, 2.0 is the sum of the probabilities of all the word candidates in a neighborhood together with the sums of:the collocation products of each neighbor with the top choice of the adjacent neighbors and probability of the top choices of the adjacent neighbors. Repeated applications of expression 2.0 effectively propagates results across a sentence. The process may require several iterations to converge on a stable state from which further iterations cause no significant changes in the rankings.

Table 1 shows an example of how the process operates. A degraded image of the sentence "Please show me where Hong Kong is!" is input to word recognizer 10. The top three recognition choices are shown in each position. These three choices are the neighborhood for each word position. Only two of the seven words are correct in the first choice. After one iteration, six of the seven are correct and after two iterations all seven word decisions are correct. Thus, the more correct words are raised in their neighborhood ranking and the less correct words are reduced in rank. The advance in rank of a given word candidate depends not only upon its own probability, but also upon its collocation with the top choice of its neighbors.

TABLE 1

An example of the relaxation process (the sentence to be recognized is "Please show me where Hong Kong is!"

| position | 1 | 2 | 3 | 4 | 5 | 6 | 7 | 8 |
|---|---|---|---|---|---|---|---|---|
| Initial Word Neighborhoods | | | | | | | | |
| top1 | Places | snow | me | whale | Kong | Kong | it | ! |
| top2 | Please | slow | we | where | Hong | Hong | is | |
| top3 | Pieces | show | mo | chore | Hung | Kung | Is | — |
| Word Neighborhoods After Iteration 1 | | | | | | | | |
| top1 | Places | show | me | where | Hong | Kong | is | ! |
| top2 | Please | slow | we | whale | Kong | Hong | it | |
| top3 | Pieces | snow | mo | chore | Hung | Kung | Is | |
| Word Neighborhoods After Iteration 2 | | | | | | | | |
| top1 | Please | show | me | where | Hong | Kong | is | ! |
| top2 | Places | slow | we | whale | Kong | Hong | it | |
| top3 | Pieces | snow | mo | chore | Hung | Kung | Is | |

Figure 3:
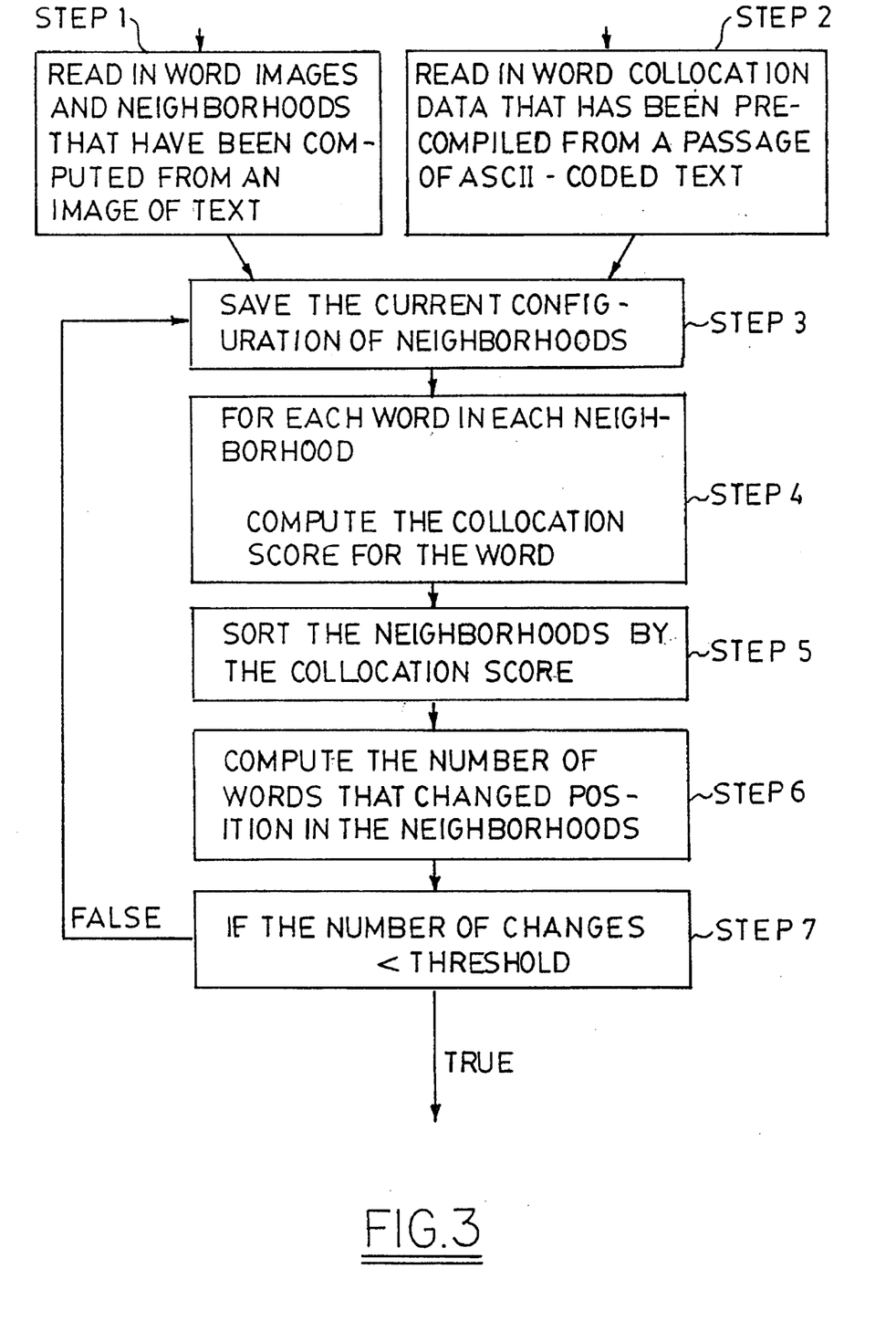
FIG. 3 is a flow chart showing the process of operation of the apparatus shown in FIG. 1.

With reference to FIG. 3, a first step in the relaxation process is to read in word images and neighborhoods that have been computed from the text image by the computer 20. Such input is well known in the art. A second step either prior or coincidental or subsequent to the first step is to read in word collocation data from a precompiled passage of ASCII coded text. In step three the neighborhoods for each word position are initially ranked from their most likely to least likely word candidates. In step four, for each word in each neighborhood the computer 20 computes the collocation score for the word candidate. After the collocation scores for all the word candidates are computed in accordance with expression 2.0, the neighborhoods are resorted by their new collocation scores. Step six computes the number word candidates that change position in the neighborhoods. In step seven, if the number of changes of word candidates within the neighborhoods is at or below a threshold number, the iterative process beginning at step three is repeated. On the other hand, if the number of changes are less than the threshold, then the top choices of each neighborhood are output as the most likely correct choices of the word recognizer 10.

Experiments and Analysis

Experiments were conducted to determine the performance of the proposed algorithm. The data used in the experiments were generated from the Brown Corpus and Penn Treebank databases. These corpora together contain over four million words of running text. The Brown corpus is divided into 500 samples of approximately 2000 words each. H. Kucera and W. N. Francis, *Computational Analysis of Preset-day American English*, Brown University Press, 1967. The part of the Penn Treebank used here is the collection of articles from the *Wall Street Journal* that contain about three million words.

Five articles were randomly selected from the Brown Corpus as test samples. They are A06, G02, J42, N01 and R07. A06 is a collection of six short articles from the *Newark Evening News*, GO2 is from an article "Toward a Concept of National Responsibility" that appeared in *The Yale Review*. J42 is from the book *"The Political Foundation of International Law."* N01 is a chapter from the adventure fiction *"The Killer Marshal."* R07 is from the humor article "Take It Off" in *The Arizona Quarterly*. Each text has about 2000 words. There are totally 10,280 words in the testing samples.

The training data from which the collocation statistics were calculated was composed of the approximately 1.2 million distinct word pairs in the combination of the Brown corpus and Penn Treebank minus the five test samples. Examples of word pairs and their frequencies are shown below.

| the | doctor | 64 |
|---|---|---|
| a | doctor | 27 |
| doctor | and | 8 |
| doctor | was | 8 |
| doctor | who | 7 |
| his | doctor | 6 |
| doctor | bills | 4 |
| ward | doctor | 1 |

A qualitative estimate for the upper bound, or best performance that could be expected with a technique that uses word collocation data, was derived from the test articles. This was done by calculating the percentage of words in the test articles that also appear in the training data. This is relevant since if a word does not occur in the training data there will be no collocations stored for it and the algorithm may not select it. The results in Table 2 show that somewhere between 97% and 98% of the isolated words in each of the test articles occur in the training data. Thus, only 2% to 3% of the words in a typical document are not found.

The potential upper bound in performance is also illustrated by the results shown in Table 3. These give the number of times each word in the test articles appear adjacent to the same word or words in the training data. Statistics are provided that show how often words in the test articles are collocated with both the word before and the word after somewhere in the training data. Also, the number of times a word is collocated only with either the word before

TABLE 2

| | Isolated word occurrence in the training data | |
|---|---|---|
| test article | no. of words | no. in training data |
| A06 | 2213 | 2137 (97%) |
| G02 | 2267 | 2201 (97%) |
| J42 | 2269 | 2208 (97%) |
| N01 | 2313 | 2271 (98%) |
| R07 | 2340 | 2262 (97%) | or the word after is given. These results show that about 60% of the words occur adjacent to the same words in both the test data and the training data. About 32% of the words are adjacent only to either the word before or the word after and 4% to 8% of the words have no collocations in the training database. Thus, an algorithm that uses collocation to choose the candidate for a word could achieve a correct rate of between 92% and 96%. However, this would require perfect knowledge about which collocation is correct. Actual performance will be less than this because of other words in the neighborhood that have collocations in the training data and the interactions of those words and their recognition confidence values during iterations of the relaxation algorithm.

TABLE 3

| | Word collocation occurrence in the training data | | |
|---|---|---|---|
| test article | no. of words | both before and after | only before or after | neither before nor after |
| A06 | 2213 | 1342 61% | 694 31% | 177 8% |
| G02 | 2267 | 1355 60% | 750 33% | 162 7% |
| J42 | 2269 | 1349 59% | 762 34% | 158 7% |
| N01 | 2313 | 1609 70% | 614 27% | 90 4% |
| R07 | 2340 | 1499 64% | 659 28% | 182 8% |

Neighborhood Generation

Neighborhoods were generated for each of the 70,000 unique words in the combined corpus of testing and training data by the following procedure. Digital images of the words were generated from their ASCII equivalents by first converting them to an 11 pt. Times Roman font in postscript with the Unix command ditroff. The postscript files were then converted into raster images with the ghostscript system.

Neighborhoods were generated for each word by first calculating a feature vector for the word known as the stroke direction feature vector in a manner known in the art to which this invention is relevant. See T. K. Ho, J. J. Hull and S. N. Srihari, "A Word Shape Analysis Approach to Lexicon Based Word Recognition," in *Pattern Recognition Letters*, Vol. 13, pp. 821–826, 1992. The neighborhoods for each dictionary word were then calculated by computing the Euclidean distance between its feature vector and the feature vectors of all the other dictionary words and sorting the result. The ten words with the smallest distance values were stored with each dictionary word as its neighborhood.

To mimic the performance of a word recognition technique in the presence of noise, the neighborhoods were corrupted. An assumed correct rate in each position in the neighborhood was given. For example, the top choice might be 80% correct, the second choice 10% correct, and so on. The noise model was applied to the text by calling a uniform random number generator for each word in the passage and scaling the result between zero and one. The correct rate distribution was then used to select the position in the neighborhood into which the correct word was moved. Thus, in the above example, 80% of the time the correct word would remain in the top position, 10% of the time it would be moved into the second position, and so on. The eight noise models shown in Table 4 were used to generate neighborhoods for the running text of the five test articles.

TABLE 4

| Performance models used to generate corrupted word recognition results | | | | | | | | | | |
|---|---|---|---|---|---|---|---|---|---|---|
| | position in neighborhodd | | | | | | | | | |
| model | 1 | 2 | 3 | 4 | 5 | 6 | 7 | 8 | 9 | 10 |
| 1 | .55 | .15 | .08 | .05 | .04 | .03 | .03 | .03 | .02 | .02 |
| 2 | .65 | .15 | .06 | .04 | .02 | .02 | .01 | .01 | .02 | .02 |
| 3 | .70 | .17 | .05 | .02 | .02 | .01 | .01 | .01 | .005 | .005 |
| 4 | .75 | .10 | .05 | .03 | .03 | .01 | .01 | .01 | .005 | .005 |
| 5 | .80 | .07 | .05 | .02 | .02 | .01 | .01 | .01 | .005 | .005 |
| 6 | .85 | .06 | .03 | .01 | .01 | .01 | .01 | .01 | .005 | .005 |
| 7 | .90 | .03 | .02 | .01 | .01 | .01 | .005 | .005 | .005 | .005 |
| 8 | .95 | .02 | .01 | .005 | .005 | .005 | .001 | .001 | .001 | .001 |

Experimental Results

Before testing the process, a baseline for performance comparison was determined. The accuracy rate in each position in the top 10 candidate list was calculated by re-ranking using word frequency, i.e., the a-priori probability of the word (see Table 5). The result shows that the correct rate of the first position in the neighborhood is around 75% by using word frequency data alone. It should be noted that these results were calculated from the entire training database, including the test articles. Since, as shown earlier, about 2% to 3% of the words in the test data do not occur in the training data, the performance obtained by re-ranking using frequency could be up to 2% to 3% lower.

TABLE 5

| Baseline for comparison (Re-ranking Top 10 List by Word Frequency) | | | | | | |
|---|---|---|---|---|---|---|
| | Article | | | | | |
| | A06 | G02 | J42 | N01 | R07 | Average |
| # of words | 2040 | 2075 | 2078 | 2021 | 2066 | 2056 |
| top1 | 73.6% | 74.7% | 75.1% | 76.6% | 76.1% | 75.2% |
| top2 | 89.0% | 88.7% | 91.8% | 89.8% | 90.1% | 89.9% |
| top3 | 94.6% | 94.6% | 95.7% | 95.5% | 95.8% | 95.2% |
| top4 | 96.9% | 97.1% | 97.8% | 97.7% | 97.5% | 97.4% |
| top5 | 98.0% | 97.8% | 98.7% | 98.8% | 98.5% | 98.4% |
| top6 | 98.4% | 99.0% | 99.0% | 99.4% | 99.2% | 99.0% |
| top7 | 99.2% | 99.3% | 99.3% | 99.6% | 99.4% | 99.4% |
| top8 | 100.0% | 99.9% | 99.9% | 100.0% | 100.0% | 100.0% |
| top9 | 100.0% | 100.0% | 100.0% | 100.0% | 100.0% | 100.0% |
| top10 | 100.0% | 100.0% | 100.0% | 100.0% | 100.0% | 100.0% |

Figure 4:
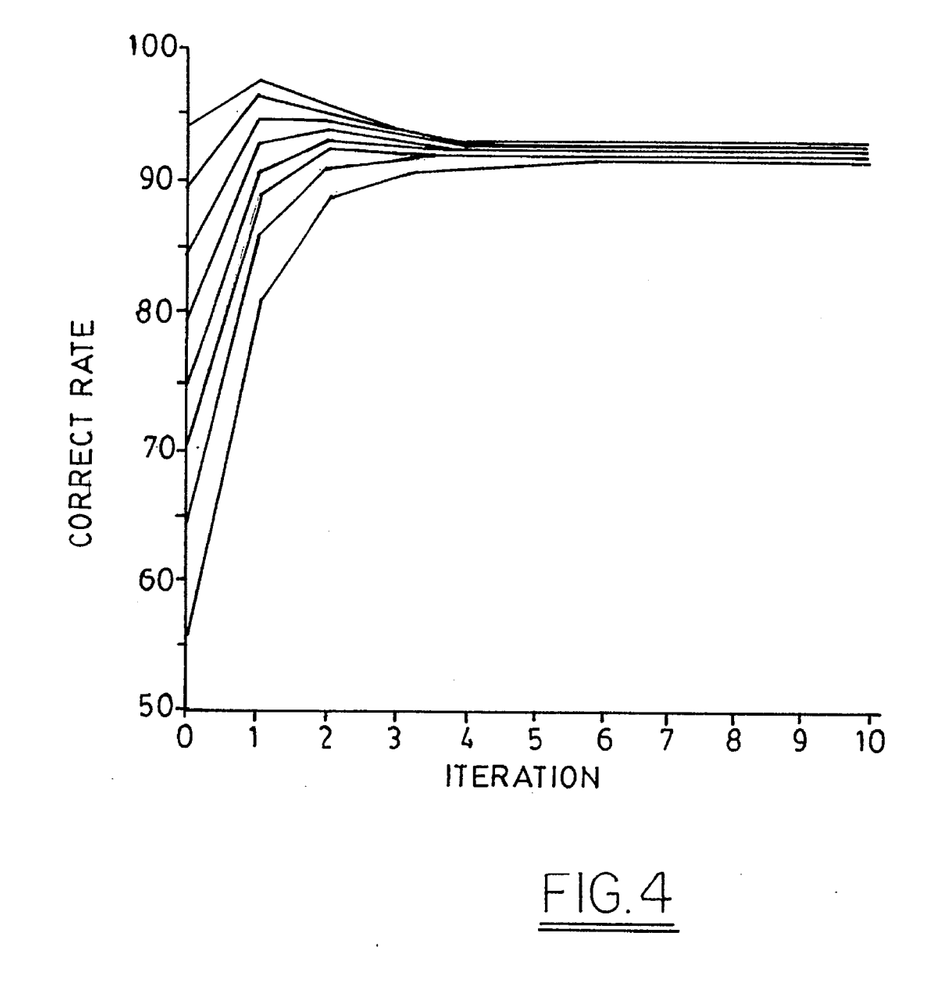
FIG. 4 is a graph showing the correct rates of the subsequent iterations.
Figure 5:
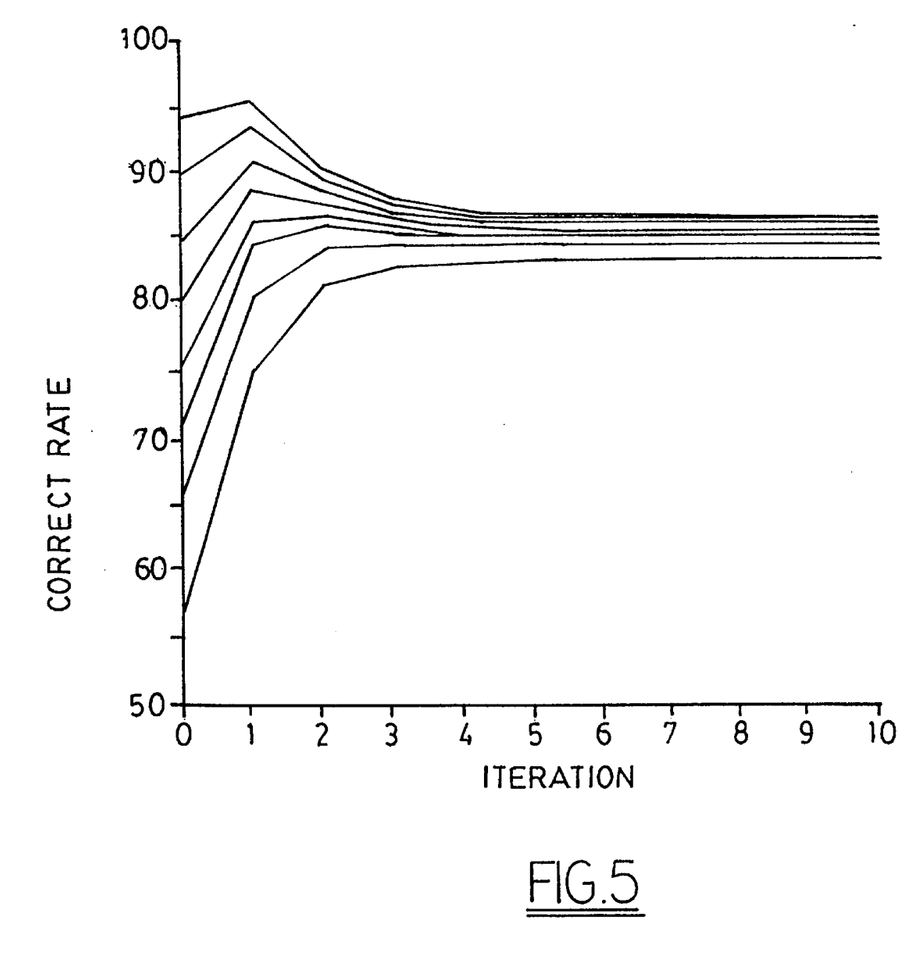
FIG. 5 is similar to FIG. 4 and includes test samples not included in FIG. 4.

The result of applying the relaxation algorithm to the neighborhoods is shown in Table 6 and FIG. 4. The average correct rate at the top choice across all the passages tested is given for ten iterations of relaxation. Table 7 and FIG. 5 shows the results obtained when the test passages are included in the training data. The differences between the two results show the effect that "perfect" collocation data can have on performance.

The top choice correct rate when the training data does not include the test passages is between 83% and 86% correct. The best performance possible, as shown in Table 7, raises the correct rate at the top choice to between 91% and 93%. This is interesting when it is considered that the top choice correct rate of the input was initially as low as 56%. In most cases the majority of the improvement in performance is obtained after three iterations.

A drop in performance can be observed after the first iteration in cases where the initial correct rate is high. For example, when the first word has a 94% correct rate, at the first iteration it is improved to 95% and then it drops to 86% after ten iterations. This same effect does not occur when the initial correct rate is lower than 80%. Thus, in practice, the number of iterations should be controlled by an estimate of the overall error rate in word recognition. If low confidences have been assigned to many words in a text passage, then this should indicate that the relaxation should be iterated until the order of the decisions in the neighborhoods ceases to change. If many words have been assigned high confidences, then the relaxation should be terminated after one or two iterations.

Also, many of the cases that were correct on the first iteration but that were placed in a lower position in the neighborhood on a subsequent iteration were short words such as "one" that were confused with function words such as "the". The higher collocation strength of the function word caused it to be chosen incorrectly. This suggests that the relaxation process should be used as part of a larger text recognition system and that this system should include a preprocessing step that detects function words and recognizes them separately, such as the preprocessing step disclosed in S. Khoubyari and J. J. Hull, "Font and Function Word Identification in Document Recognition," *Computer Vision, Graphics, and Image Processing: Image Understanding*, 1995. The relaxation process would then be applied to the other words in the text. Since these will be the information-bearing words, the relaxation approach will be more likely to perform correctly.

There has been described a relaxation process that used word collocation information to improve text recognition results. The experimental results showed that the correct rate at the top choice of a word recognition algorithm could be improved from 56% to 83% correct. This is a substantial improvement compared to the best that could be obtained by re-ranking the neighborhoods using a-priori probability alone. The performance gap between the results achieved when the collocation data includes the test data and when it does not suggests that word collocation data should be collected from larger and more balanced English corpora. Analysis of the remaining errors showed that many of them could be corrected by using a larger window size and special strategies for processing proper nouns. Modifications of the ranking function will also be considered.

The relaxation process currently works as one part of a degraded text recognition system. There are two types of linguistic constraints used in the system. Besides word collocation data, global structural constraints from an English grammar are employed such as disclosed by T. Hong and J. J. Hull, "Text Recognition Enhancement with a Probabilistic Lattice Chart Parser," *Proceedings of the Second International Conference on Document Analysis* ICDAR-93, Tsukuba, Japan, pp. 222–225, pp. 222–225, Oct. 20–22, 1993. Visual global contextual information available inside a text page is also being considered for integration with the linguistic knowledge sources to further improve the performance of degraded text recognition.

Having thus described the preferred embodiments of the invention, those skilled in the art will realize that further changes, additions, and modifications can be made to the invention without departing from the spirit and scope of the appended claims. For example, the scanner may employ a charge coupled device (CCD) imager having an army of CCD cells of as many as one million or more. Such imagers are exposed, usually via a lens, to the entire document. The CCD imager has a shift register output that generates on analog signal of image intensity. That signal is then con-

TABLE 6

Correct rate at each iteration of relaxation

| Initial | Iter. 1 | Iter. 2 | Iter. 3 | Iter. 4 | Iter. 5 | Iter. 6 | Iter. 7 | Iter. 8 | Iter. 9 | Iter. 10 |
|---|---|---|---|---|---|---|---|---|---|---|
| 56.4% | 74.6% | 81.2% | 82.5% | 82.9% | 83.1% | 83.2% | 83.3% | 83.3% | 83.2% | 83.2% |
| 65.2% | 80.3% | 83.8% | 84.2% | 84.0% | 84.1% | 84.1% | 84.1% | 84.1% | 84.1% | 84.1% |
| 70.9% | 84.1% | 85.6% | 85.0% | 84.9% | 84.8% | 84.7% | 84.7% | 84.8% | 84.7% | 84.7% |
| 75.2% | 85.8% | 96.4% | 85.4% | 85.1% | 85.0% | 85.0% | 84.9% | 84.9% | 84.9% | 84.9% |
| 79.9% | 88.4% | 87.4% | 86.1% | 85.5% | 85.3% | 85.2% | 85.1% | 85.1% | 85.1% | 85.1% |
| 84.5% | 90.7% | 88.3% | 86.7% | 86.0% | 85.9% | 85.7% | 85.6% | 85.6% | 85.6% | 85.6% |
| 89.7% | 93.4% | 89.2% | 87.2% | 86.4% | 86.1% | 86.0% | 85.9% | 86.0% | 85.9% | 85.9% |
| 94.1% | 95.4% | 90.0% | 87.6% | 86.8% | 86.5% | 86.4% | 86.3% | 86.3% | 86.2% | 86.2% |

TABLE 7

Correct rate in relaxation when collocation includes test samples

| Initial | Iter. 1 | Iter. 2 | Iter. 3 | Iter. 4 | Iter. 5 | Iter. 6 | Iter. 7 | Iter. 8 | Iter. 9 | Iter. 10 |
|---|---|---|---|---|---|---|---|---|---|---|
| 56.4% | 80.7% | 88.5% | 90.2% | 90.7% | 91.0% | 91.2% | 91.2% | 91.3% | 91.3% | 91.3% |
| 65.2% | 85.8% | 90.9% | 91.6% | 91.8% | 91.8% | 91.8% | 91.9% | 91.9% | 91.9% | 91.9% |
| 70.9% | 88.9% | 92.2% | 92.1% | 92.0% | 92.0% | 91.9% | 91.9% | 91.9% | 91.9% | 91.9% |
| 75.2% | 90.5% | 93.0% | 92.5% | 92.3% | 92.3% | 92.1% | 92.1% | 92.1% | 92.1% | 92.1% |
| 79.9% | 92.7% | 93.7% | 92.9% | 92.6% | 92.5% | 92.3% | 92.2% | 92.2% | 42.2% | 92.2% |
| 84.5% | 94.5% | 94.4% | 93.3% | 92.8% | 92.7% | 92.5% | 92.5% | 92.5% | 92.4% | 92.4% |
| 89.7% | 96.4% | 95.0% | 93.7% | 93.0% | 92.8% | 92.6% | 92.5% | 92.5% | 92.5% | 92.4% |
| 94.1% | 97.5% | 95.5% | 93.8% | 93.1% | 92.9% | 92.7% | 92.7% | 92.7% | 92.6% | 92.7% | verted into digital pixel data signals for segmentation and word recognition.

Moreover, while the above examples have used the top choices of two adjacent neighbors, those skilled in the art will realize that one could use a single neighbor top choice for collocation. One could also use collocation data between the top choices of more distant neighbors, e.g. $\omega_{i+2,1}$, $\omega_{i+3,1}$, etc.

What we claim is:

1. A word recognition method comprising:
   (a) dividing a document into a two dimensional matrix of pixel areas;
   (b) scanning the pixel areas with a light source and detecting the intensity of light from each pixel area to generate a plurality of pixel data signals, each pixel data signal being proportional to the intensity of light detected from its corresponding pixel area;
   (c) comparing the pixel data signals to data signals stored in a memory that represent alphanumeric characters and words in order to initially recognize word candidates from said pixel data signals;
   (d) generating a ranking of candidates for each word based upon a likelihood of correctness of each candidate, each ranking having a top choice indicating the initial most likely correct candidate for the word;
   (e) grouping ranked word candidates into neighborhoods, each neighborhood comprising two or more word candidates and each neighborhood being adjacent to at least one other neighborhood;
   (f) reading from a read only memory word collocation data for each word candidate and one or more top choice adjacent word candidates;
   (g) computing a collocation score for each word candidate and the top choice of at least two adjacent neighborhoods wherein the collocation score for each word candidate is computed by adding the probability of correctness of the word candidate to the products of (i) the collocation data of the candidate and its top choice neighbors and (ii) the probability of correctness for the top choice neighbor and dividing the result by the sums of the probabilities of correctness of all the words in the neighborhood and the sums of the products of (i) collocation data of each neighbor with the top choice of the adjacent neighbors and the (ii) the probability of correctness of the top choices of the adjacent neighbors;
   (h) sorting word candidates by their collocation score;
   (i) comparing changes between the word candidates of the initial neighborhoods and the word candidates in the sorted neighborhood;
   (j) counting the number of changes for the neighborhoods; and
   (k) repeating steps (e) through (i) until the number of changes is less than a predetermined threshold value.

2. The method of claim 1 wherein the collocation score:

$$P_{(\omega_{ij})}^{(k+1)} = \frac{P_{(\omega_{ij})}^{(k)} + \gamma_{(\omega_{ij},\omega_{i+1,1})} P_{(\omega_{i+1,1})}^{(k)} + \gamma_{(\omega_{i-1,1},\omega_{ij})} P_{(\omega_{i-1,1})}^{(k)}}{\sum_{l=1}^{n} [P_{(\omega_{il})}^{(k)} + \gamma_{(\omega_{il},\omega_{i+1,1})} P_{(\omega_{i+1,1})}^{(k)} + \gamma_{(\omega_{i-1,1},\omega_{il})} P_{(\omega_{i-1,1})}^{(k)}]}$$

where $P_{(\omega_{ij})}^{(k+1)}$ is the probabilistic score of the word candidate $\omega_{ij}$ at time k+1 and n are the number of neighbors in a neighborhood.

3. The method of claim 1 wherein the collocation score includes a plurality of products of collocations between the word candidates and the top choices of two or more neighborhoods.

4. The method of claim 1 wherein the word collocation data comprises a mutual frequency of adjacent words in a corpus of words.

5. A word recognition apparatus comprising:

a document scanner for scanning a document a document with a light source by dividing the scanned document into a two dimensional matrix of pixel areas and scanning each pixel areas with a light source to generate a plurality of pixel data signals, each pixel data signal being proportional to the intensity of light at its corresponding pixel area;

a computer having a central processing unit including an arithmetic logic unit, a random access memory for storing input data and calculated data, and a read only memory for storing operating and application programs, and further memory for storing data corresponding to pixel data signals of alphanumeric characters and words in order to recognize word candidates from input pixel data signals and a word collocation database, said computer coupled to the scanner for receiving the pixel data signals;

said computer comparing the light intensity pixel data signals to data signals stored in said memory holding alphanumeric characters and words in order to initially recognize word candidates from said pixel data signals;

said computer generating a ranking of candidates for each word in proportion to the correspondence between the pixel data signals for a word candidate and the stored word data, each ranking having a top choice indicating the initial most likely correct candidate for the word;

said computer grouping word candidates into neighborhoods, each neighborhood comprising two or more word candidates and each neighborhood being adjacent at least one other neighborhood;

said computer reading from the word collocation database word collocation data for each word candidate;

said arithmetic logic unit computing a collocation score for each word candidate and one or more top choices of two adjacent word candidates wherein the collocation score for each word candidate is computed by adding the probability of correctness of the word candidate to the products of (i) the collocation data of the candidate and its top choice neighbors and (ii) the probability of correctness for the top choice neighbor and dividing the result by the sums of the probabilities of correctness of all the words in the neighborhood and the sums of the products of (i) collocation data of each neighbor with the top choice of the adjacent neighbors and the (ii) the probability of correctness of the top choices of the adjacent neighbors;

said arithmetic logic unit computing and storing a collocation score;

said arithmetic logic unit sorting word candidates by their collocation score;

said arithmetic logic unit comparing changes between the word candidates of the initial neighborhoods and the word candidates in the sorted neighborhood;

said arithmetic logic unit counting the number of changes for the neighborhoods; and said computer outputting a list of likeliest word candidates when the number of changes is less than a predetermined threshold value.

6. The apparatus of claim 5 wherein the word collocation data comprises a mutual frequency of adjacent words in a corpus of words.

7. The apparatus of claim 5 wherein the collocation score for each word candidate is computed by the following expression:

$$P^{(k+1)}_{(\omega_{ij})} = \frac{P^{(k)}_{(\omega_{ij})} + \gamma_{(\omega_{ij},\omega_{i+1,1})} P^{(k)}_{(\omega_{i+1,1})} + \gamma_{(\omega_{i-1,1},\omega_{ij})} P^{(k)}_{(\omega_{i-1,1})}}{\sum_{l=1}^{n} [P^{(k)}_{(\omega_{il})} + \gamma_{(\omega_{il},\omega_{i+1,1})} P^{(k)}_{(\omega_{i+1,1})} + \gamma_{(\omega_{i-1,1},\omega_{il})} P^{(k)}_{(\omega_{i-1,1})}]}$$

where $P^{(k+1)}_{(\omega_{ij})}$ is the probabilistic score of the word candidate $\omega_{ij}$ at time k+1 and n are the number of neighbors in a neighborhood.

8. The apparatus of claim 5 wherein the collocation score includes a plurality of products of collocations between the word candidates and the top choices of two or more neighborhoods.

* * * * *